United States Patent [19]

Clark et al.

[11] 4,012,310
[45] Mar. 15, 1977

[54] ELECTROSTATIC WATER TREATMENT SYSTEM

[75] Inventors: David C. Clark; John K. Barnard, both of Erie, Pa.

[73] Assignee: Progressive Equipment Corporation, Erie, Pa.

[22] Filed: Sept. 11, 1975

[21] Appl. No.: 612,466

[52] U.S. Cl. .............................................. 204/305
[51] Int. Cl.² ........................................ B03C 5/02
[58] Field of Search .................. 204/302–308, 204/149, 186

[56] References Cited
UNITED STATES PATENTS

| 2,470,741 | 5/1949 | Gordon | 204/273 |
| 2,726,356 | 12/1955 | Rockafellow | 315/183 |
| 3,250,695 | 5/1966 | Winslow, Jr. et al. | 204/305 |
| 3,446,724 | 5/1969 | Winslow, Jr. et al. | 204/191 |
| 3,518,174 | 6/1970 | Inoue | 204/149 |
| 3,547,801 | 12/1970 | Albright et al. | 204/305 |

Primary Examiner—John H. Mack
Assistant Examiner—Aaron Weisstuch
Attorney, Agent, or Firm—Ralph Hammar

[57] ABSTRACT

An electrostatic water treatment system in which the high voltage d.c. supply for the charging electrode is alternately turned on and off at lower and upper voltage limits and is turned off whenever the current exceeds the desired value. The alternating voltage produced by the on-off operation of the high voltage supply is utilized to check the control circuit and provide an indication whenever the circuit is operating improperly.

12 Claims, 1 Drawing Figure

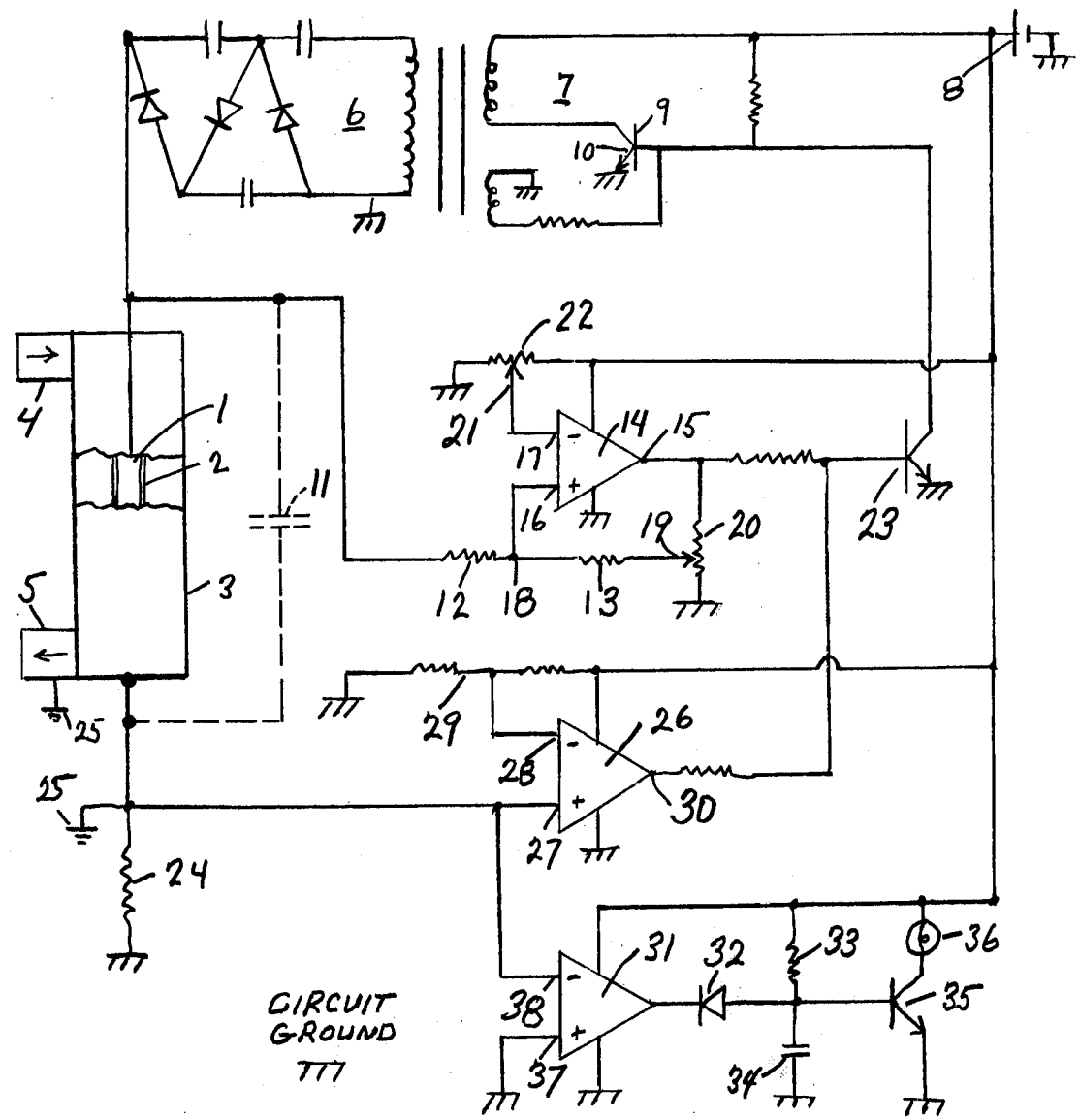

ELECTROSTATIC WATER TREATMENT SYSTEM

This invention is an electrostatic water treatment system with an alternating on-off power supply, over current protection and an indicator which comes on whenever there is a system failure.

In the drawing, the single FIGURE is a circuit diagram.

In the electrostatic treatment of water an electrode 1 having an insulating coating 2 is positively charged by a high d.c. voltage (e.g. 1,000 to 12,000 volts). The electrode is at the center of an externally grounded shell 3 and the water to be treated enters through fitting 4 and leaves through fitting 5. While the annular stream of water flows past the electrode, the positive charge on the electrode attracts free electrons from the water and minerals and causes electron collisions with mineral and biological material in the water. As a result, the mineral and biological material settle out and may be periodically flushed down a drain.

The high voltage power supply for the electrode 1 consists of a d.c. multiplier 6 fed by a transistor oscillator 7 and a constant voltage d.c. power supply 8. When the unit is first turned on the base 9 of transistor 10 is above ground level and the transistor is turned on allowing the high voltage output of the multiplier 6 to charge the electrode 1. The capacitance between the electrode 1 and the shell 3 is represented by dotted line capacitor 11 and the voltage to which the capacitor is charged is divided by resistors 12 and 13 to the level suited to operational amplifier 14 which has the property of producing an output at terminal 15 proportional to the difference between the input voltages at the terminals 16 and 17. The voltage at terminal 16 is obtained from the center terminal 18 of voltage divider 12, 13 and the slider 19 of a potentionmeter 20 connected between output terminal 15 and circuit ground. The voltage at terminal 17 is a constant reference voltage obtained from the slider 21 of a potentiometer 22 connected from the power supply 8 to circuit ground. When the voltage at terminal 16 exceeds the voltage at terminal 17, the voltage output terminal 15 rises from system ground to the voltage of power supply 8. This turns transistor 23 on and consequently turns transistor 10 and multiplier 6 off. The voltage between electrode 1 and shell 3 (capacitor 11) now discharges through resistors 12, 13, potentiometer 20 and resistor 24 connected between the external ground 25 and the system ground. When the reference voltage at terminal 17 becomes greater than the voltage at terminal 16, transistor 23 is turned off, turning transistor 10 on and starting the cycle over again. This on-off action saves power while maintaining adequate voltage on electrode 1 for performing the desired water treatment and also produces a small alternating voltage superimposed upon the d.c. voltage output of multiplier 6.

Under normal operation, the current flow within the power supply is very small. However, if the insulation 2 breaks down, there will be a direct short between the electrode 1 and the shell 3 which drops the voltage and prevents treatment. Over current protection is provided by operational amplifier 26 have an input terminal 27 connected to receive the voltage across resistor 24, another input terminal 28 connected to the center tap 29 of a voltage divider connected across the power supply 8 and an output terminal 30 connected to the base of transistor 23. Excessive current causes the voltage at terminal 27 to exceed the voltage at terminal 28 causing the voltage at output terminal 30 to rise from its normal or no overload value of system ground to supply voltage 8, turning on transistor 23 and shutting off the high voltage supply 6. The current limiting circuit is designed to override the voltage regulating circuit of amplifier 14.

To enhance the reliability and to provide for ease of trouble shooting, the continuity of the external circuit is constantly checked by operational amplifier 31, diode 32, resistor 33, capacitor 34, transistor 35, and lamp 36. This section of the circuit works as follows. Because of the action of the voltage regulator circuit 12–23 there is a small AC voltage produced across resistor 24 by the charging and discharging of capacitor 11. This voltage is always present providing the regulator is working properly and the external circuit is completed by capacitor 11. This voltage is not present when there is a short circuit between electrode 1 and shell 3.

This small voltage, because it is alternating current, is varying both above and below the reference point of operational amplifier 31. The voltage of input terminal 37 is being compared with the voltage at input terminal 38. The output of terminal 39 accordingly is an alternating voltage in step with the voltage between terminal 37, 38. Capacitor 34 is charged through resistor 33 and is discharged through diode 32. As long as there is an AC voltage between 37, 38 and the time constant of 33, 34 is long enough, diode discharges the capacitor 34 before resistor 33 can charge it sufficiently to turn on transistor 35 and lamp 36. If for any reason the AC voltage between 37, 38 is not present, the capacitor 34 is charged by resistor 33 and the transistor 35 and lamp 36 are turned on. The lighting of lamp 36 indicates the absence of an adequate voltage on electrode 1 for performing the desired water treatment.

What is claimed is:

1. An electrostatic water treatment system having an insulated electrode and a ground electrode and adapted to receive water to be treated between the electrodes so the electrodes are in capacitance relation to each other through the water to be treated, said insulated electrode having an insulated coating for insulating it from the water, said ground electrode adapted to be in contact with the water, a power supply having a positive terminal connected to said insulated electrode and a negative terminal connected to said ground electrode for charging said insulated electrode to a high positive d.c. voltage relative to said ground electrode, and means for alternately turning the power supply on when the voltage drops to a lower limit and off when the voltage rises to an upper limit, said means further providing a small alternating voltage superimposed on said d.c. voltage.

2. The system of claim 1 on which the negative terminal of said power supply is a circuit ground terminal which is connected by a resistor to said ground electrode.

3. The system of claim 2 in which said alternating voltage appears across said resistor and in which said alternating voltage further provides means for indicating whether or not the insulated electrode has adequate voltage for performing the desired water treatment.

4. The system of claim 4 in which the means for indicating whether or not the system is provided with adequate voltage for performing the desired water treatment is further defined as a transistor turned on by a predetermined voltage to which a capacitor is charged and an operational amplifier utilizing said alternating voltage for periodically discharging said capacitor.

5. The system of claim 2 having means responsive to a rise in voltage across said resistor for shutting off the said power and the means for alternately turning the power on and off.

6. The system of claim 5 having means responsive to the absence of said small alternating voltage for indicating the absence of adequate voltage for performing the desired water treatment.

7. The system of claim 2 in which said alternating voltage further provides means for indicating whether or not the system is drawing current above a predetermined upper limit.

8. The system of claim 1 in which said alternating voltage further provides means for indicating whether or not the insulated electrode has adequate voltage for performing the desired water treatment.

9. The system of claim 1 in which means responsive to the flow of current between said electrodes greater than a predetermined upper limit turns off the power supply and overrides the means for turning the power on and off.

10. The system of claim 1 in which said alternating voltage further provides means for indicating whether or not the system is drawing current above a predetermined upper limit.

11. An electrostatic water treatment system having an insulated electrode and a ground electrode and adapted to receive water to be treated between the electrodes so the electrodes are in capacitance relation to each other through the water being treated, said insulated electrode having an insulating coating for insulating it from the water, said ground electrode adapted to be in contact with the water, a power supply having a positive terminal connected to said insulated electrode and a negative terminal connected to said ground electrode for charging said insulated electrode to a high positive d.c. voltage relative to said ground electrode, and means for indicating whether or not the voltage present between said insulated and ground electrode is adequate to treat the water.

12. The system of claim 6 having in addition means for shutting off the power supply whenever the insulating coating breaks down and permits the flow of current greater than a predetermined upper limit from the insulated electrode through the water to the ground electrode.

* * * * *